(12) United States Patent
Johnson et al.

(10) Patent No.: US 11,143,041 B2
(45) Date of Patent: Oct. 12, 2021

(54) TURBINE HAVE A FIRST AND SECOND ROTOR DISC AND A FIRST AND SECOND COOLING FLUID CONDUIT WHEREIN THE SECOND COOLING FLUID CONDUIT IS EXTENDED THROUGH AN ANNULAR AXIALLY EXTENDED BORE HAVING A RADIALLY OUTER EXTENT DEFINED BY A RADIALLY INNERMOST SURFACE OF THE ROTOR DISCS

(71) Applicant: GENERAL ELECTRIC COMPANY, Schenectady, NY (US)

(72) Inventors: Brian David Johnson, Portsmouth, NH (US); Daniel Waslo, Marblehead, MA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 587 days.

(21) Appl. No.: 15/401,461

(22) Filed: Jan. 9, 2017

(65) Prior Publication Data

US 2018/0195395 A1 Jul. 12, 2018

(51) Int. Cl.
*F01D 5/30* (2006.01)
*F01D 5/08* (2006.01)

(52) U.S. Cl.
CPC .......... *F01D 5/3015* (2013.01); *F01D 5/082* (2013.01); *F05D 2260/205* (2013.01); *Y02T 50/60* (2013.01)

(58) Field of Classification Search
CPC ... F01D 5/3015; F01D 5/082; F05D 2260/205

USPC ......................................................... 415/115
See application file for complete search history.

(56) References Cited

U.S. PATENT DOCUMENTS

| | | | |
|---|---|---|---|
| 3,575,522 A | 4/1971 | Melenchuk | |
| 5,134,844 A | 8/1992 | Lee et al. | |
| 5,311,749 A | 5/1994 | McAuliffe et al. | |
| 5,593,274 A | 1/1997 | Carreno et al. | |
| 5,619,850 A | 4/1997 | Palmer et al. | |
| 5,695,319 A * | 12/1997 | Matsumoto | F01D 5/085 415/114 |
| 6,065,282 A * | 5/2000 | Fukue | F02C 7/185 415/115 |
| 6,098,395 A | 8/2000 | North | |
| 6,276,896 B1 | 8/2001 | Burge et al. | |
| 6,290,464 B1 | 9/2001 | Negulescu et al. | |
| 6,370,866 B2 * | 4/2002 | Marushima | F01D 25/12 415/114 |

(Continued)

FOREIGN PATENT DOCUMENTS

JP H07295292 A 11/1995

*Primary Examiner* — Patrick Hamo
*Assistant Examiner* — Benjamin Doyle
(74) *Attorney, Agent, or Firm* — Dority & Manning, P.A.

(57) ABSTRACT

The turbine includes a first turbine rotor disc, a second turbine rotor disc, a first source of cooling fluid, and a first cooling fluid conduit. The first turbine rotor disc has a first outer circumference and a first plurality of blades spaced along the first outer circumference. The second turbine rotor disc has a second outer circumference and a second plurality of blades spaced along the second outer circumference. The first cooling fluid conduit is configured to channel a first flow of cooling fluid from the first source of cooling fluid through the first turbine rotor disc to a blade of the second plurality of blades.

20 Claims, 3 Drawing Sheets

(56) References Cited

U.S. PATENT DOCUMENTS

| | | |
|---|---|---|
| 7,007,488 B2 | 3/2006 | Orlando et al. |
| 7,093,418 B2 | 8/2006 | Morris et al. |
| 7,775,764 B2 | 8/2010 | Snowsill et al. |
| 8,967,944 B2 | 3/2015 | Suciu et al. |
| 9,091,173 B2 | 7/2015 | Mosley et al. |
| 2003/0035717 A1* | 2/2003 | Tiemann ................ F02C 7/185 415/115 |
| 2015/0337733 A1* | 11/2015 | Roush ..................... F01D 5/082 60/806 |
| 2016/0131032 A1 | 5/2016 | Pomme |

* cited by examiner

TURBINE HAVE A FIRST AND SECOND ROTOR DISC AND A FIRST AND SECOND COOLING FLUID CONDUIT WHEREIN THE SECOND COOLING FLUID CONDUIT IS EXTENDED THROUGH AN ANNULAR AXIALLY EXTENDED BORE HAVING A RADIALLY OUTER EXTENT DEFINED BY A RADIALLY INNERMOST SURFACE OF THE ROTOR DISCS

BACKGROUND

The field of the disclosure relates generally to gas turbine engines and, more particularly, to gas turbine engines having a stage two blade cooling delivery circuit for reducing a temperature of the second stage of turbine blades within a high pressure turbine.

At least some known gas turbine engines include a high pressure compressor rotatably coupled to a high pressure turbine through a shaft. Typically the shaft is supported by one or more bearings. Sumps or regions around the bearings receive buffer air to pressurize and cool the sump. After the buffer air has pressurized and cooled the sump, it may be bled overboard. Generally, it is desirable to recycle the bled buffer air. One of the primary reasons the buffer air is bled overboard, rather than being recycled, is that other fluid conduits occupy the limited number of viable passageways within the engine. One such fluid conduit which prevents recycling of the buffer air is the second stage cooling delivery circuit. The second stage delivery circuit delivers cooling air to the second stage turbine blades of the high pressure turbine. The second stage delivery circuit typically runs through axially-oriented holes in the first-stage turbine disk. These holes, spaced in between bolts coupling the high pressure turbine rotors together are one of the only available passageways for the buffer air. Bleeding the buffer air overboard, rather than recycling it, reduces the efficiency of the engine.

BRIEF DESCRIPTION

In one aspect, a turbine is provided. The turbine includes a first turbine rotor disc, a second turbine rotor disc, a first source of cooling fluid, and a first cooling fluid conduit. The first turbine rotor disc has a first outer circumference and a first plurality of blades spaced along the first outer circumference. The second turbine rotor disc has a second outer circumference and a second plurality of blades spaced along the second outer circumference. The first cooling fluid conduit is configured to channel a first flow of cooling fluid from the first source of cooling fluid through the first turbine rotor disc to a blade of the second plurality of blades.

In another aspect, a core engine is provided. The core engine includes a compressor, a combustor, and a turbine coupled in a serial flow arrangement. The compressor is coupled to the turbine by a shaft. The turbine includes a rotor including at least one disc. The at least one disc includes opposing axially facing surfaces and a circumferentially extending radially facing surface extending between the axially facing surfaces. The plurality of blades is positioned on the radially facing surface of the at least one disc. The turbine also includes a first source of cooling fluid and a first cooling fluid conduit configured to channel a first flow of cooling fluid from the first source of cooling fluid through the at least one disc to a blade of the plurality of blades positioned on the radially facing surface of the at least one disc.

In yet another aspect, a method of cooling a turbine is provided. The turbine includes a first turbine rotor disc and a second turbine rotor disc. The first turbine disc includes a first outer circumference and a first plurality of blades spaced along the first outer circumference. The second turbine rotor disc includes a second outer circumference and a second plurality of blades spaced along the second outer circumference. The method includes channeling a first flow of cooling fluid through a first cooling fluid conduit through the forward disc stage to a blade of the second plurality of blades. The method also includes channeling a second flow of cooling fluid through a second cooling fluid conduit through the bore cavity of the forward disc stage and the second turbine rotor disc, exiting to a hot gas flow path within the turbine.

DRAWINGS

These and other features, aspects, and advantages of the present disclosure will become better understood when the following detailed description is read with reference to the accompanying drawings in which like characters represent like parts throughout the drawings, wherein.

Figure 1:
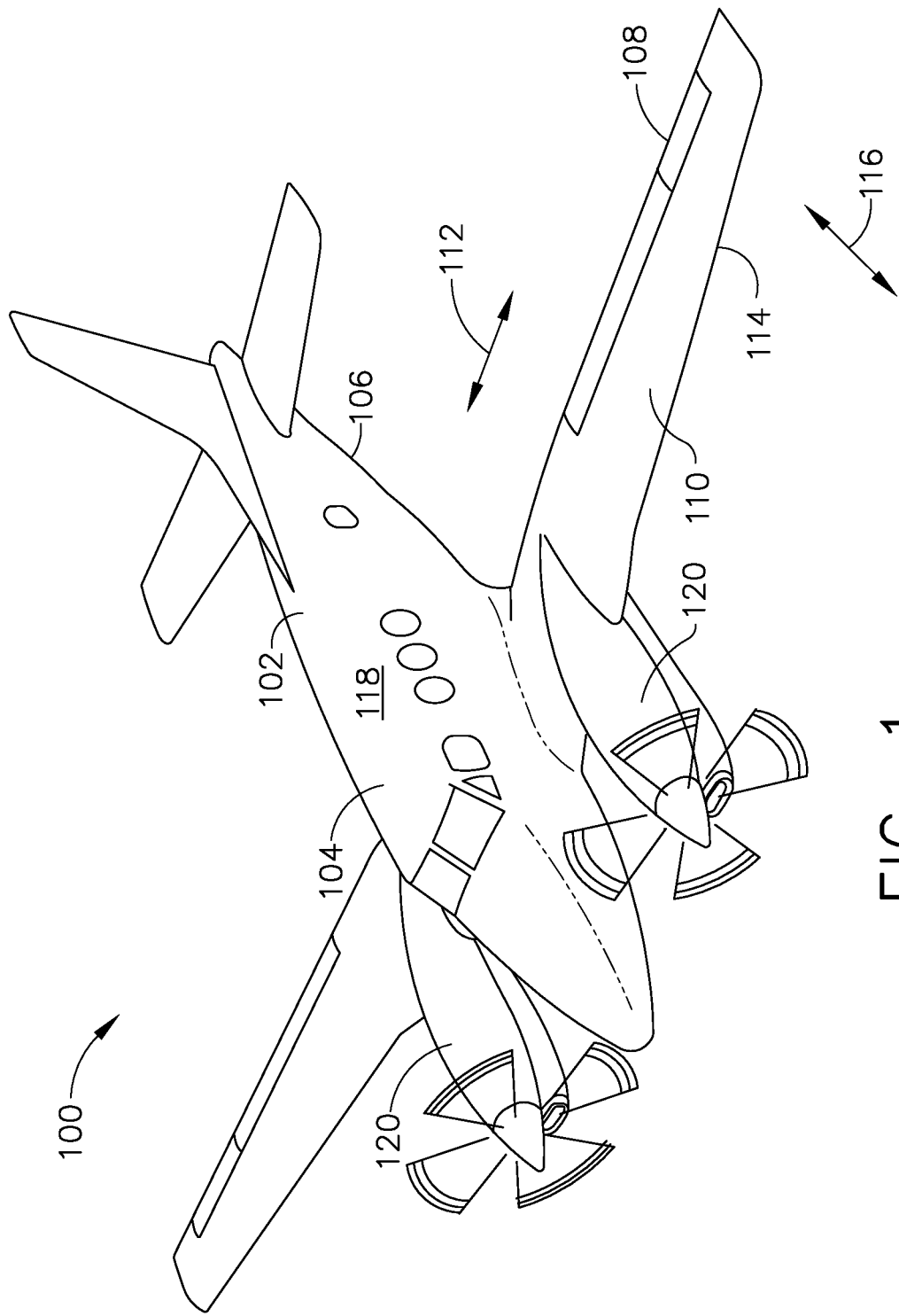
FIG. 1 is a perspective view of an aircraft including an engine in accordance with an example embodiment of the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "axial" and "axially" refer to directions and orientations that extend substantially parallel to a centerline of an engine. Moreover, the terms "radial"

and "radially" refer to directions and orientations that extend substantially perpendicular to the centerline of the engine. In addition, as used herein, the terms "circumferential" and "circumferentially" refer to directions and orientations that extend arcuately about the centerline of the engine. Furthermore, as used herein, "heated" wall refers to a wall heated by a heat source, such as engine components, adjacent the heated wall, and "unheated" wall refers to a wall that is not heated by that same heat source that heats the heated wall.

Embodiments of the cooling delivery circuit described herein provide a solution to the above-described problems. More particularly, a turbine within a gas turbine engine includes a forward disc stage and an aft disc stage. Both the forward and the aft disc stages include turbine blades positioned on the outer circumference of the forward and the aft disc stages. The cooling delivery circuit is configured to deliver cooling fluid to turbine blades on the aft stage disc and cooling fluid aft of the aft stage disc to feed downstream rotor purges. The cooling delivery circuit includes a second stage cooling delivery conduit and an aft rotor purge delivery conduit. The second stage cooling delivery conduit extends through the forward and the aft disc stages and under a blade positioned on the outer circumference forward disc stage. The routing of the second stage cooling delivery conduit allows the aft rotor purge delivery conduit to be routed through the central tie bolt which couples the forward and the aft disc stages. Routing the aft rotor purge delivery conduit through the central tie bolt allows reuse of sump pressurization air and seal leakage air for aft rotor purge rather than another dedicated source of purge air. Typically, sump pressurization air is dumped overboard rather than recycled for aft purge air. Recycling sump air increases the efficiency of the engine and decreases the fuel consumption of the engine.

Referring now to the drawings, in which like numerals refer to the same elements throughout the several views, FIG. 1 is a perspective view of an aircraft 100. In the example embodiment, aircraft 100 includes a fuselage 102 that includes a nose 104, a tail 106, and a hollow, elongate body 108 extending therebetween. Aircraft 100 also includes a wing 110 extending away from fuselage 102 in a lateral direction 112. Wing 110 includes a forward leading edge 114 in a direction 116 of motion of aircraft 100 during normal flight and an aft trailing edge 118 on an opposing edge of wing 110. Aircraft 100 further includes at least one engine 120 configured to drive a bladed rotatable member 122 or fan to generate thrust. Engine 120 is coupled to at least one of wing 110 and fuselage 102, for example, in a pusher configuration (not shown) proximate tail 106. Although shown as a turboprop engine in FIG. 1, engine 120 may be embodied in a military purpose engine, a turbofan engine, a turboshaft engine, and/or any other type of engine.

Figure 2:
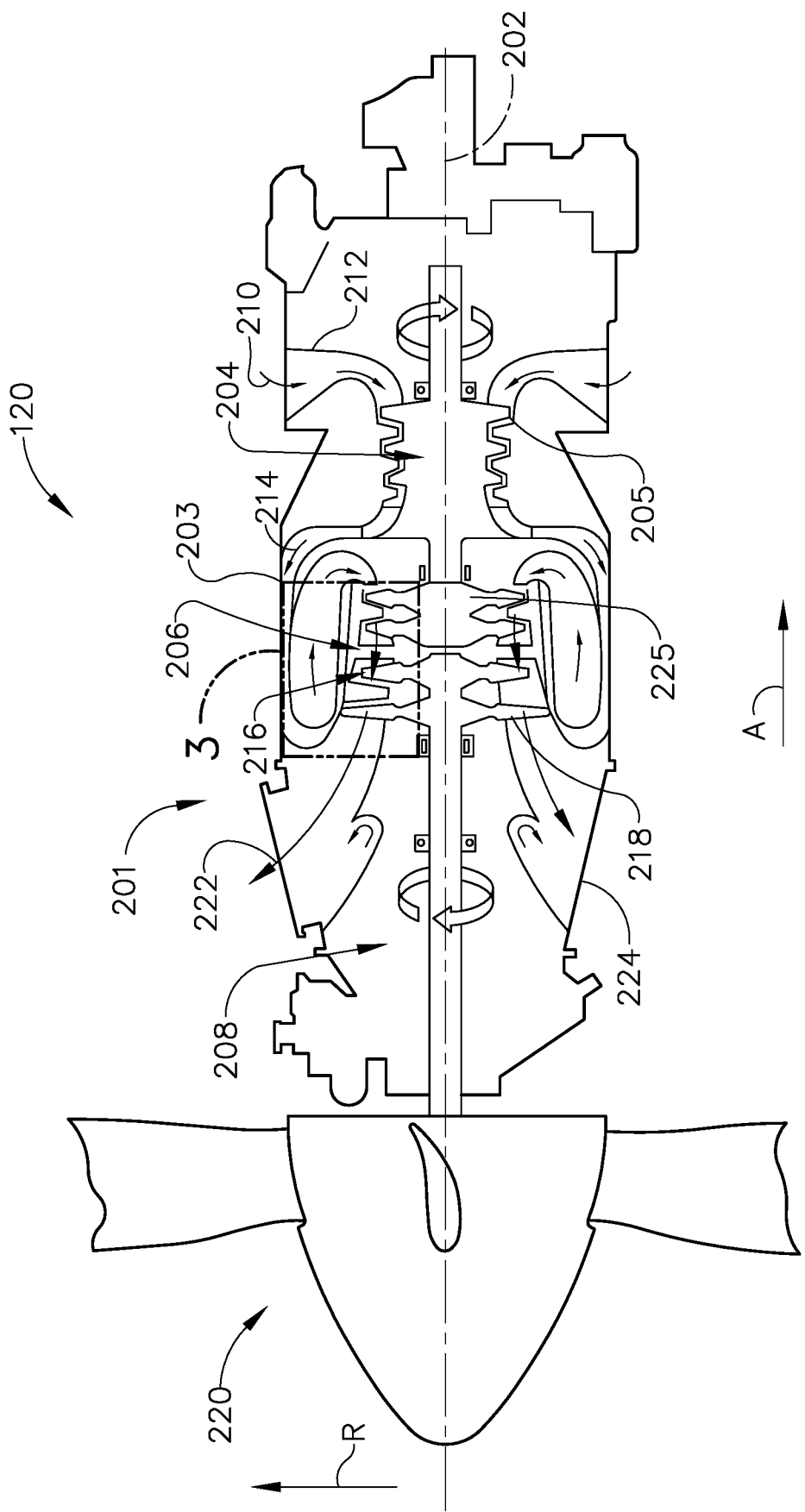
FIG. 2 is a schematic illustration of an exemplary engine as shown in FIG. 1.

FIG. 2 is a schematic cross-sectional view of engine 120 embodied as a turboprop engine in accordance with one exemplary embodiment of the present disclosure. In the example embodiment, engine 120 is a reverse flow gas turboprop engine. While the example embodiment illustrates a reverse flow gas turboprop engine, the present disclosure is not limited to such an engine, and one of ordinary skill in the art will appreciate that the current disclosure may be used in connection with other turbine engines, such as, but not limited to, conventional flow turbine engines. As shown in FIG. 2, engine 120 defines an axial direction A (extending parallel to a longitudinal axis of rotation 202 provided for reference) and a radial direction R.

In the example embodiment, engine 120 includes a core engine 201. Core engine 201 includes an outer casing 203 encasing a (high-pressure) compressor 204, a combustor section 206, and a turbine section 208. An incoming flow of air 210 flows through an annular air inlet 212 and into an inlet duct 205 of compressor 204. Air 210 is compressed by compressor 204. Compressor 204 delivers a compressed flow of air 214 to combustor section 206, where compressed air 214 is mixed with a pressurized flow of fuel. The mixture is ignited to create a flow of hot combustion gases 216. The flow of the hot combustion gases 216 is in turn channeled to turbine section 208. The flow of hot combustion gases 216 drives one or more turbine rotors 218, 225 in turbine section 208 so as to produce mechanical work. Turbine section includes a high pressure (HP) turbine rotor 225 and a low pressure (LP) turbine rotor 218. In the exemplary embodiment, mechanical work produced by HP turbine rotor 225 drives compressor 204 via a shaft. LP turbine rotor 218 drives an external load, such as a propeller 220 or electrical generator. Exhaust gas 222 is exhausted through one or more radial ducts 224. Engine 120 uses at least one of natural gas, various types of syngas, and/or another suitable fuel.

Figure 3:
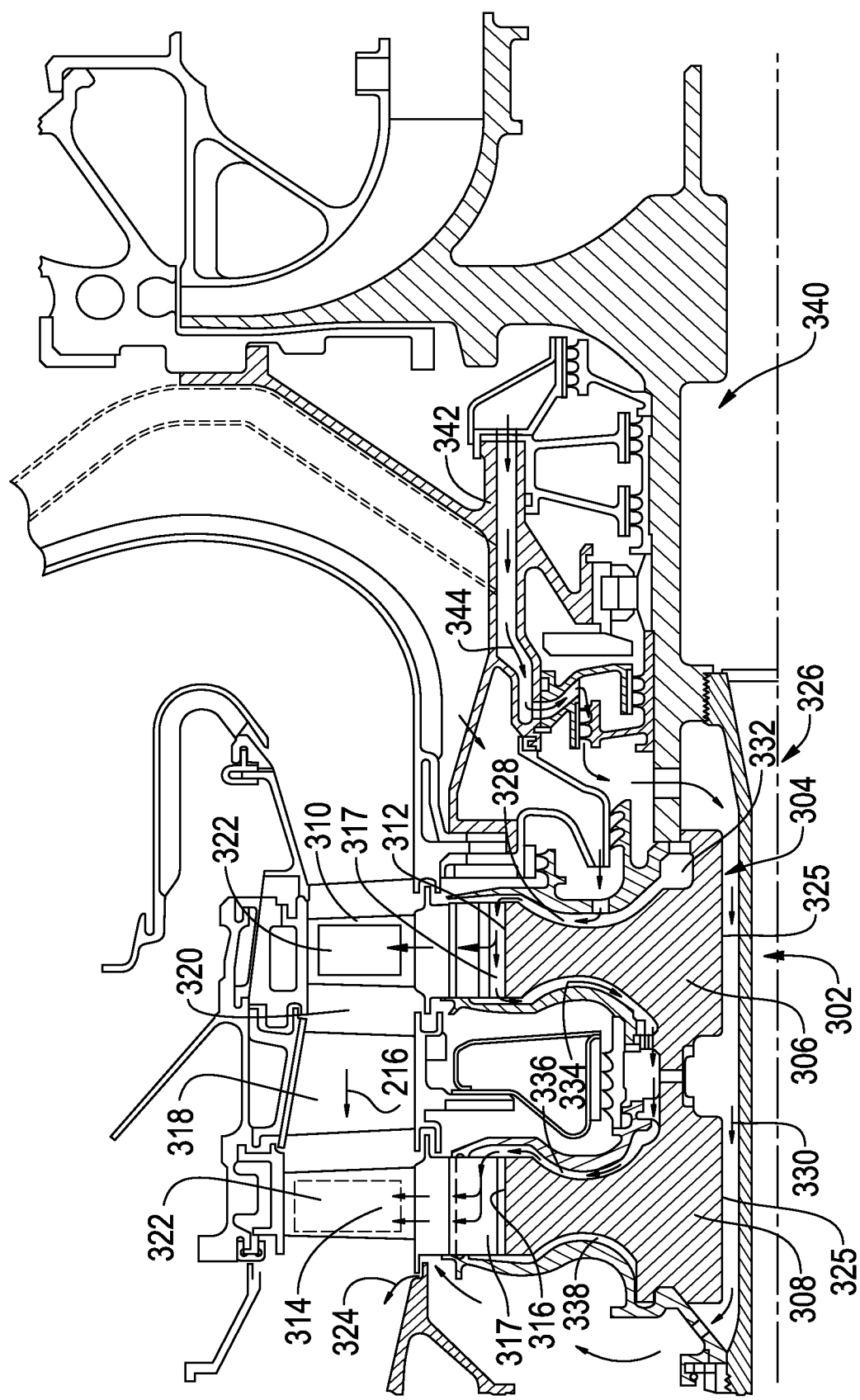
FIG. 3 is a schematic illustration of a high pressure turbine within the turboprop engine shown in FIG. 2.

FIG. 3 is a schematic cross-sectional view of a portion of HP turbine rotor 225. HP turbine rotor 225 includes a turbine rotor 302 and a plurality of turbine discs 304 coupled to turbine rotor 302. In the exemplary embodiment, plurality of turbine discs 304 includes a forward stage disc 306 and an aft stage disc 308. In the exemplary embodiment, HP turbine rotor 225 includes two turbine discs 304 (forward stage disc 306 and aft stage disc 308). However, HP turbine rotor 225 includes any number of turbine discs 304 that enable HP turbine rotor 225 to operate as described herein, including one, three, and four turbine discs 304. Forward stage disc 306 includes a plurality of forward stage disc blades 310 positioned on an outer circumference 312 of forward stage disc 306. Aft stage disc 308 includes a plurality of aft stage disc blades 314 positioned on an outer circumference 316 of aft stage disc 308. Forward stage disc blades 310 and aft stage disc blades 314 each include a dovetail 317 which is configured to couple forward stage disc blades 310 and aft stage disc blades 314 to outer circumference 312 and outer circumference 316, respectively. HP turbine rotor 225 further includes a plurality of stator vanes 318 positioned between forward stage disc blades 310 and aft stage disc blades 314. The flow of the hot combustion gases 216 is channeled through a hot gas path 320.

During operation, the flow of the hot combustion gases 216 are routed through HP turbine rotor 225 where a portion of thermal and/or kinetic energy from hot combustion gases 216 is extracted via sequential stages of forward stage disc blades 310, aft stage disc blades 314, and stator vanes 318, thus causing turbine rotor 302 to rotate, thereby producing mechanical work. Heat from hot combustion gases 216 may cause components within HP turbine rotor 225 to expand and contract. To reduce the metal temperature of forward stage disc blades 310 and/or dovetails 317 and aft stage disc blades 314 and/or dovetails 317, each forward stage disc blade 310 and aft stage disc blade 314 may include a blade cooling system 322. Additionally, in order to control the metal temperature of turbine discs 306 and 308 and prevent ingestion of combustion gases 216 into the cavity aft of turbine disc 308, a flow of rotor purge air 324 is channeled under the bores 325 of discs 306 and 308 and expelled into hot gas path 320.

A cooling delivery circuit 326 includes a plurality of first cooling fluid conduits or cooling air delivery conduits 328 configured to channel cooling air to blade cooling systems 322 and/or to control metal temperatures of discs 306 and 308. Cooling delivery circuit 326 further includes a plurality of second cooling fluid conduits or purge air delivery conduits 330 configured to channel purge air 324 to hot gas path 320.

A cooling air delivery conduit 328 extends through forward stage disc 306 and aft stage disc 308 to deliver air to blade and/or disk (dovetail) cooling systems 322 within aft stage disc blades 314. First, cooling air delivery conduit 328 extends through a forward portion 332 of forward stage disc 306. Next cooling air delivery conduit 328 extends through dovetail 317 under forward stage disc blades 310. Next cooling air delivery conduit 328 extends through an aft portion 334 of forward stage disc 306. Next cooling air delivery conduit 328 extends through a forward portion 336 of aft stage disc 308. Finally, cooling air delivery conduit 328 extends through dovetail 317 of aft stage disc blades 314 and/or into blade cooling systems 322 within aft stage disc blades 314. In another embodiment, cooling air delivery conduit 328 extends through forward portion 336 of aft stage disc 308 and an aft portion 338 of aft stage disc 308. In another embodiment, cooling air delivery conduit 328 channels cooling air into blade cooling systems 322 within forward stage disc blades 310 and blade cooling systems 322 within aft stage disc blades 314. In another embodiment, neither forward stage disc blades 310 nor aft stage disc blades 314 include blade cooling systems 322. Rather, forward stage disc blades 310 and aft stage disc blades 314 include an uncooled blade design and do not require cooling. However, cooling air delivery conduit 328 delivers cooling air to dovetails 317.

Cooling air delivery conduit 328 receives cooling air from a first source of cooling air or compressor 204. In the exemplary embodiment, first source of cooling air includes compressor 204. However, first source of cooling air may be any source of cooling air which enables cooling delivery circuit 326 to operate as described herein.

Purge air delivery conduits 330 extends beneath turbine rotor 302 to provide metal temperature control on turbine discs 306 and 308 and also channels purge air 324 to hot gas path 320. In the exemplary embodiment, purge air delivery conduits 330 includes multiple purge air delivery conduits 330. In another embodiment, purge air delivery conduits 330 includes a single purge air delivery conduit 330.

Purge air delivery conduits 330 receives cooling air from a second source of cooling air or seal pressurization air supplied to sump 340. In the exemplary embodiment, second source of cooling air includes seal leakage and seal pressurization air supplied to sump 340. However, second source of cooling air may be any source of cooling air which enables cooling delivery circuit 326 to operate as described herein. Sump 340 is a chamber which supports rotor bearings. Sump 340 includes a sump casing 342 which, in turn, includes a sump conduit 344. Sump conduit 344 channels sump pressurization air from sump 340, through sump casing 342, to purge air delivery conduits 330. Sump pressurization air is used to pressurize sump 340 and the source of this air is from an intermediate compressor bleed.

During operation, compressor 204 channels cooling air to cooling air delivery conduit 328 which may channel cooling air to blade cooling systems 322 within aft stage disc blades 314. Blade cooling system 322 cools aft stage disc blades 314 and reduces the metal temperature of aft stage disc blades 314 caused by hot combustion gases 216. In another embodiment, cooling air delivery conduit 328 channels cooling air into blade cooling systems 322 within forward stage disc blades 310 and blade cooling systems 322 within aft stage disc blades 314 and reduces the metal temperature of forward stage disc blades 310 and aft stage disc blades 314 caused by hot combustion gases 216.

Intermediate compressor bleed channels pressurization air to sump 340. Sump conduit 344 channels sump pressurization air from sump 340, through sump casing 342, to purge air delivery conduits 330. Purge air delivery conduits 330 channels sump air or purge air 324 beneath turbine rotor 302 and into hot gas path 320. Purge air 324 has a lower temperature than hot gas 216 and controls the metal temperatures of components within hot gas path 320 caused by hot combustion gases 216. In the exemplary embodiment, previously existing conduits within sump 340 (sump conduit 344) allow sump pressurization air to feed purges within hot gas path 320. Using sump 340 to feed downstream purges increases the efficiency of the engine because a dedicate source of purge air is not required. Additionally, using sump 340 to feed downstream purges reduces the weight of the engine because a dedicated purge air system is not required.

In the exemplary embodiment, HP turbine rotor 225 is an overhung high pressure turbine. An overhung high pressure turbine is a turbine in which the high pressure rotor is aft (flow-wise) in axial direction A of the bearing which is supporting the aft end of the rotor. However, turbine 218 may include any turbine architecture which enables cooling delivery circuit 326 to operate as described herein.

In the example embodiment, forward stage disc 306, aft stage disc 308, sump casing 342, and turbine rotor 302 are fabricated using an additive manufacturing process. As used herein, "additive manufacturing" refers to any process which results in a three-dimensional object and includes a step of sequentially forming the shape of the object one layer at a time. Additive manufacturing processes include, for example, three dimensional printing, laser-net-shape manufacturing, direct metal laser sintering (DMLS), direct metal laser melting (DMLM), selective laser sintering (SLS), plasma transferred arc, freeform fabrication, and the like. One exemplary type of additive manufacturing process uses a laser beam to sinter or melt a powder material. Additive manufacturing processes can employ powder materials or wire as a raw material. Moreover, additive manufacturing processes can generally relate to a rapid way to manufacture an object (article, component, part, product, etc.) where a plurality of thin unit layers are sequentially formed to produce the object. For example, layers of a powder material may be provided (e.g., laid down) and irradiated with an energy beam (e.g., laser beam) so that the particles of the powder material within each layer are sequentially sintered (fused) or melted to solidify the layer. For example, in some embodiments, forward stage disc 306, aft stage disc 308, sump casing 342, and turbine rotor 302 are fabricated by at least one of molding, cutting, and/or 3-D printing. Fabricating forward stage disc 306, aft stage disc 308, sump casing 342, and turbine rotor 302 using an additive manufacturing process allows cooling air delivery conduit 328, purge air delivery conduits 330, and sump conduit 344 to be specifically designed to fit any kind of complex geometry of forward stage disc 306, aft stage disc 308, sump casing 342, and turbine rotor 302. It should be understood that other methods of providing or fabricating forward stage disc 306, aft stage disc 308, sump casing 342, and turbine rotor 302 may be implemented. Moreover, forward stage disc 306, aft stage disc 308, sump casing 342, and turbine rotor 302 may be fabricated using any of the above-described processes.

The above-described cooling delivery circuit provides an efficient method for cooling a turbine within an engine. Specifically, the above-described system includes a cooling delivery conduit and an aft rotor purge delivery conduit. The cooling delivery conduit extends through the forward and the aft disc stages and through a blade positioned on the outer circumference forward disc stage. The routing of the cooling delivery conduit allows the aft rotor purge delivery conduit to be routed through the central tie bolts which couple the forward and the aft disc stages. Routing the aft rotor purge delivery conduit through the central tie bolt allows exhausted sump pressurization air to be used for aft rotor purge rather than another dedicated source of purge air. Typically, exhausted sump pressurization air is dumped overboard rather than recycled for aft rotor purge air. Recycling sump air increases the efficiency of the engine and decreases the fuel consumption of the engine.

Exemplary embodiments of a cooling delivery circuit are described above in detail. The cooling delivery circuit, and methods of fabricating and using the same, are not limited to the specific embodiments described herein, but rather, components of the cooling delivery circuit and/or steps of the method may be utilized independently and separately from other components and/or steps described herein. For example, the cooling delivery circuit designed may be used in combination with other systems requiring cooling of a turbine, and are not limited to practice with only the systems and methods as described herein. Rather, the exemplary embodiment can be implemented and utilized in connection with many other engine and/or non-engine applications that are currently configured to a turbine.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A turbine comprising:
   a first turbine rotor disc having a first outer circumference and a first plurality of blades spaced along the first outer circumference;
   a second turbine rotor disc having a second outer circumference and a second plurality of blades spaced along the second outer circumference;
   a first source of cooling fluid;
   a first cooling fluid conduit configured to channel a first flow of cooling fluid in serial flow from said first source of cooling fluid to a first forward portion of the first turbine rotor disc, to the first outer circumference of the first turbine rotor disc, to a second forward portion of the second turbine rotor disc, and to the second outer circumference of the second turbine rotor disc; and
   a second cooling fluid conduit extended through an annular axially extended bore having a radially outer extent defined by a radially innermost surface of said first turbine rotor disc and second turbine rotor disc, wherein the second cooling fluid conduit is configured to channel a second flow of cooling fluid through said annular axially extended bore.

2. The turbine of claim 1, wherein said first cooling fluid conduit extends in serial flow communication from said first source of cooling fluid to the first forward portion of the first turbine rotor disc, to the first outer circumference of the first turbine rotor disc, to a first aft portion of the first turbine rotor disc, and further wherein the first cooling fluid conduit extends through one or more of said first plurality of blades.

3. The turbine of claim 1, wherein said first cooling fluid conduit extends in serial flow communication to the first forward portion of the first turbine rotor disc, to a first aft portion of the first turbine rotor disc, to the second forward portion at said second turbine rotor disc, and then to the second outer circumference of the second turbine rotor disc.

4. The turbine of claim 1, wherein the second cooling fluid conduit is configured to channel the second flow of cooling fluid inward along the radial direction of a bore of each respective first turbine rotor disc and second turbine rotor disc.

5. The turbine of claim 1, further comprising a second source of cooling fluid coupled in flow communication with said second cooling fluid conduit, and wherein the second cooling fluid conduit is fluidly separate from the first cooling fluid conduit.

6. The turbine of claim 5, wherein said second source of cooling fluid comprises a bearing sump comprising a sump conduit configured to channel the second cooling fluid to the second cooling fluid conduit.

7. The turbine of claim 6, further comprising a hot gas flow path through said turbine and configured to channel a flow of hot gas, said second cooling fluid conduit configured to channel said second flow of cooling fluid to said hot gas flow path.

8. The turbine of claim 1, wherein said first source of cooling fluid comprises a compressor.

9. A core engine comprising an axis of rotation and configured to generate a flow of high energy combustion gases, said core engine comprising:
   a compressor, a combustor, and a turbine coupled in serial flow communication, said compressor coupled to said turbine by a shaft, said turbine comprising:
      a rotor comprising at least one disc, said at least one disc including opposing axially facing surfaces and a circumferentially extending radially facing surface extending between the axially facing surfaces;
      a plurality of blades positioned on said radially facing surface of said at least one disc;
      a first source of cooling fluid;
      a first cooling fluid conduit configured to channel a first flow of cooling fluid in serial flow from said first source of cooling fluid to a first forward axially facing surface, to a radially facing surface, and then to a first aft axially facing surface, and wherein the first cooling fluid is then configured to channel the first flow of cooling fluid to one or more of said plurality of blades positioned on said at least one disc; and
      a second cooling fluid conduit extended through an annular axially extended bore having a radially outer extent defined by a radially innermost surface of said first turbine rotor disc and second turbine rotor disc, wherein the second cooling fluid conduit is configured to channel a second flow of cooling fluid.

10. The core engine of claim 9, wherein said at least one disc comprises a first turbine rotor disc and a second turbine rotor disc coupled to said first turbine rotor disc, wherein said first cooling fluid conduit is configured to channel the first flow of cooling fluid from said first source of cooling fluid to the first forward axially facing surface of the first turbine rotor disc, to the radially facing surface of the first turbine rotor disc, and then to the first aft axially facing surface of the first turbine rotor disc, and then to one or more of said plurality of blades positioned on said radially facing surface of said second turbine rotor disc.

11. The core engine of claim 10, wherein said first cooling fluid conduit extends through one or more of said plurality of blades positioned on said radially facing surface of said first turbine rotor disc.

12. The core engine of claim 10, wherein said first cooling fluid conduit extends through a second forward axially facing surface of said second turbine rotor disc.

13. The core engine of claim 9, wherein the second cooling fluid conduit is configured to channel the second flow of cooling fluid inward along a radial direction of a bore of each respective first turbine rotor disc and second turbine rotor disc.

14. The core engine of claim 13, further comprising a second source of cooling fluid coupled in flow communication with said second cooling fluid conduit.

15. The core engine of claim 14, wherein said second source of cooling fluid comprises a bearing sump, said bearing sump comprising a sump conduit configured to channel the second cooling fluid to the second cooling fluid conduit.

16. The core engine of claim 15, further comprising a hot gas flow path through said turbine, said second cooling fluid conduit configured to channel said second flow of cooling fluid to said hot gas flow path, and wherein the first cooling fluid conduit and the second cooling fluid conduit are fluidly separate from one another before the hot gas flow path.

17. A method of cooling a turbine, the turbine comprising a first turbine rotor disc and a second turbine rotor disc, the first turbine disc having a first outer circumference and a first plurality of blades spaced along the first outer circumference, the second turbine rotor disc having a second outer circumference and a second plurality of blades spaced along the second outer circumference, said method comprising:
   channeling a first flow of cooling fluid through a first cooling fluid conduit in serial flow to a first forward portion of the first turbine disc, to the first outer circumference of the first turbine disc, and to a second forward portion of the second turbine disc, and to the second outer circumference of the second turbine disc, and to a blade of the second plurality of blades; and
   channeling a second flow of cooling fluid through a second coding fluid conduit, extended through an annular axially extended bore having a radially outer extent defined by a radially innermost surface of the first turbine rotor disc and the second turbine rotor disc, to a hot gas flow path within the turbine.

18. The method of claim 17, further comprising channeling the first flow of cooling fluid from a first source of cooling fluid to the first cooling fluid conduit.

19. The method of claim 17, wherein channeling the first flow of cooling fluid from the first source of cooling fluid to the first cooling fluid conduit comprises channeling the first flow of cooling fluid from a compressor to the first cooling fluid conduit.

20. The method of claim 17, wherein channeling the second flow of cooling fluid radially inward of the first turbine rotor and the second turbine rotor is fluidly separate from channeling the first flow of cooling fluid at the first turbine disc and the second turbine disc.

* * * * *